(12) United States Patent
Cho

(10) Patent No.: US 9,660,309 B2
(45) Date of Patent: May 23, 2017

(54) DEVICE AND METHOD FOR RAISING TEMPERATURE OF BATTERY MODULE IN ECO-FRIENDLY VEHICLE

(71) Applicant: HYUNDAI MOBIS CO., LTD., Seoul (KR)

(72) Inventor: Youngjae Cho, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/645,766

(22) Filed: Mar. 12, 2015

(65) Prior Publication Data

US 2015/0270587 A1  Sep. 24, 2015

(30) Foreign Application Priority Data

Mar. 18, 2014 (KR) ........................ 10-2014-0031592

(51) Int. Cl.

| | |
|---|---|
| *H01M 10/615* | (2014.01) |
| *H01M 10/63* | (2014.01) |
| *H01M 10/6563* | (2014.01) |
| *H01M 10/48* | (2006.01) |
| *B60L 11/18* | (2006.01) |
| *H01M 10/625* | (2014.01) |

(Continued)

(52) U.S. Cl.
CPC ......... *H01M 10/63* (2015.04); *B60L 11/1875* (2013.01); *H01M 10/482* (2013.01); *H01M 10/486* (2013.01); *H01M 10/615* (2015.04); *H01M 10/625* (2015.04); *H01M 10/647* (2015.04); *H01M 10/6556* (2015.04); *H01M 10/6563* (2015.04); *Y10S 903/907* (2013.01)

(58) Field of Classification Search
CPC   B60L 11/187; B60L 11/1874; B60L 11/1875; B60L 2240/545; H01M 10/613; H01M 10/615; H01M 10/6563; B60H 2001/003
See application file for complete search history.

(56) References Cited

U.S. PATENT DOCUMENTS

| | | | | |
|---|---|---|---|---|
| 5,387,477 A | * | 2/1995 | Cheiky ............... | H01M 2/1061 429/407 |
| 2002/0034682 A1 | * | 3/2002 | Moores, Jr. ............ | B25F 5/008 429/120 |

(Continued)

FOREIGN PATENT DOCUMENTS

| | | |
|---|---|---|
| CN | 201741732 U | 2/2011 |
| CN | 103618121 A | 3/2014 |
| KR | 10-2011-0024410 A | 3/2011 |

*Primary Examiner* — Dale Moyer
(74) *Attorney, Agent, or Firm* — Knobbe Martens Olson & Bear LLP

(57) ABSTRACT

A device for raising a temperature of a battery module for an eco-friendly vehicle, the battery module including a plurality of battery cells disposed at intervals in a housing thereof, the device blowing air introduced by a blowing fan to the battery cells to raise a temperature of each the battery cell, the device may include a temperature sensor provided on each battery cell for measuring a temperature of corresponding battery cell, a flow passage for guiding air flowed from a blowing fan to each battery cell, and an air flow rate control means provided at a region connecting the flow passage and each battery cell to control the flow rate of air introduced to each battery cell.

17 Claims, 6 Drawing Sheets

(51) Int. Cl.
*H01M 10/647* (2014.01)
*H01M 10/6556* (2014.01)

(56) References Cited

U.S. PATENT DOCUMENTS

| | | | | |
|---|---|---|---|---|
| 2011/0308765 | A1* | 12/2011 | Kumar | B60L 11/1874 165/47 |
| 2012/0164508 | A1* | 6/2012 | Houchin-Miller | B60K 6/442 429/120 |
| 2014/0038007 | A1* | 2/2014 | Ahn | H01M 10/5008 429/62 |
| 2015/0004449 | A1* | 1/2015 | Lim | H01M 10/625 429/62 |

* cited by examiner

DEVICE AND METHOD FOR RAISING TEMPERATURE OF BATTERY MODULE IN ECO-FRIENDLY VEHICLE

CROSS-REFERENCE TO RELATED APPLICATIONS

This application claims priority to Korean Patent Application No. 10-2014-0031592 filed on Mar. 18, 2014, which is incorporated herein by reference in its entirety.

BACKGROUND

The present disclosure relates to a device and method for raising a temperature of a battery module in an eco-friendly vehicle.

In an eco-friendly vehicle such as a hybrid vehicle and an electric vehicle, a battery module is provided for supplying an electric power to a driving motor. The battery module includes a plurality of battery cells disposed and stacked in a housing and a device for changing the temperature of the plurality of battery cells.

SUMMARY

An aspect of the present invention provides a device and method for raising a temperature of a battery module in an eco-friendly vehicle, which varies a flow rate of air flowed to every battery cell according to a temperature of each battery cell to raise the temperatures the battery cells constituting the battery module in an eco-friendly vehicle, to the same temperature.

Another aspect of the present invention provides a device and method for raising a temperature of a battery module in an eco-friendly vehicle, which can control a flow rate of air flowed from a blowing fan according to an average temperature of the battery cells.

Still another aspect provides a device for raising a temperature of a battery module for an eco-friendly vehicle, the battery module including a plurality of battery cell disposed at intervals in a housing thereof, the device blowing air introduced by a blowing fan to the battery cells to raise a temperature of each the battery cell, the device includes a temperature sensor provided on each battery cell for measuring a temperature of corresponding battery cell; a flow passage for guiding air flowed from a blowing fan to each battery cell; and an air flow rate control means provided at a region connecting the flow passage and each battery cell to control the flow rate of air introduced to each battery cell.

The air flow rate control means may be shutter blades provided in the flow passage and operated to a predetermined open angle to control the flow rate of air introduced from the flow passage to the battery cell according to the open angle.

The open angles of the shutter blades may be controlled to the different angle to each other so that the different air amount to each other is introduced at every battery cells. The plurality of shutter blades may be installed at each battery cells.

The open angle of the shutter blade may be controlled such that the lower the temperature of the battery cell, the more the flow rate of air supplied to the battery cell is increased.

The device for raising a temperature of the battery module for an eco-friendly vehicle of embodiments of the present invention may further include a battery management system (BMS) receiving a signal regarding the temperature of each battery cell from the temperature sensor and controlling a speed of the blowing fan and the open angles of the shuttle blades according to the temperatures of the battery cells.

The blowing fan is controlled such that as the average temperature of the battery cells is lowered, the flow rate of air supplied from the blowing fan is increased.

Air introduced to the battery cell through the blowing fan may be heated by heat generated from an engine of a hybrid vehicle.

The battery cells are disposed in the direction perpendicular to a flow of air discharged from an outlet of the blowing fan and are disposed in parallel with each other.

Meanwhile, a method for raising a temperature of a battery module for an eco-friendly vehicle according to embodiments of the present invention including a plurality of battery cells disposed at intervals in the battery module, and blowing an air introduced by a blowing fan to the battery cells to raise a temperature of each the battery cell, the method comprising; measuring an individual battery cell temperature for measuring a temperature of each battery cell; calculating an open angle of the shutter blade which is provided at a region connecting the flow passage and the battery cell, in order to control the amount of air flowed from the blowing fan and supplied to each battery cell to allow the temperatures of the battery cells to reach the same target temperature; and controlling the shutter blade provided at each battery cell on the basis of the open angle calculated in the shutter blade open angle calculating step.

The method for raising a temperature of the battery module for an eco-friendly vehicle may further includes, between the individual battery cell temperature measuring step and the shutter blade open angle calculating step, calculating an average temperature of the battery cells; and controlling a rotational speed of the blowing fan to control the entire flow rate.

The blowing fan blowing the raised temperature air is controlled such that as the average temperature of the battery cells is lowered, a rotational speed of the blowing fan is increased.

The blowing fan is operated at the specified speed for the temperature range predetermined according to the average temperature of the battery cells.

The average temperature of the battery cells is divided into the temperature ranges at predetermined intervals from a predetermined initiation temperature of a temperature raising process and a rotational speed of the blowing fan is designated for each temperature range to blow air, which has a temperature is higher than the average temperature of the battery cells, to the batter cell.

If the average temperature of the battery cells is lower than a predetermined operation halt temperature, an operation of the battery cells is halted.

The operation halt temperature is set as the lowest limit of the temperature range at which the speed of blowing fan is maximally set.

In the shutter blade open angle calculating step, the open angle of the shutter blade is determined by a difference between the average temperature of the battery cells and the temperature of the corresponding battery cell.

The open angle of the shutter blade is increased in proportion to the difference between the average temperature of all the battery cells and the temperature of the corresponding battery cell.

The temperature difference between the average temperature of all the battery cells and the temperature of the corresponding battery cell is divided into five (5) regions, and the shutter blade is operated to the open angle predetermined according to the temperature difference.

After the shutter blade controlling step, a vehicle traveling judging step is carried out for judging whether the vehicle is being traveled, and if it is judged that the vehicle is being traveling, the procedure is returned to the individual battery cell temperature measuring step.

DESCRIPTION OF EMBODIMENTS

Figure 1:
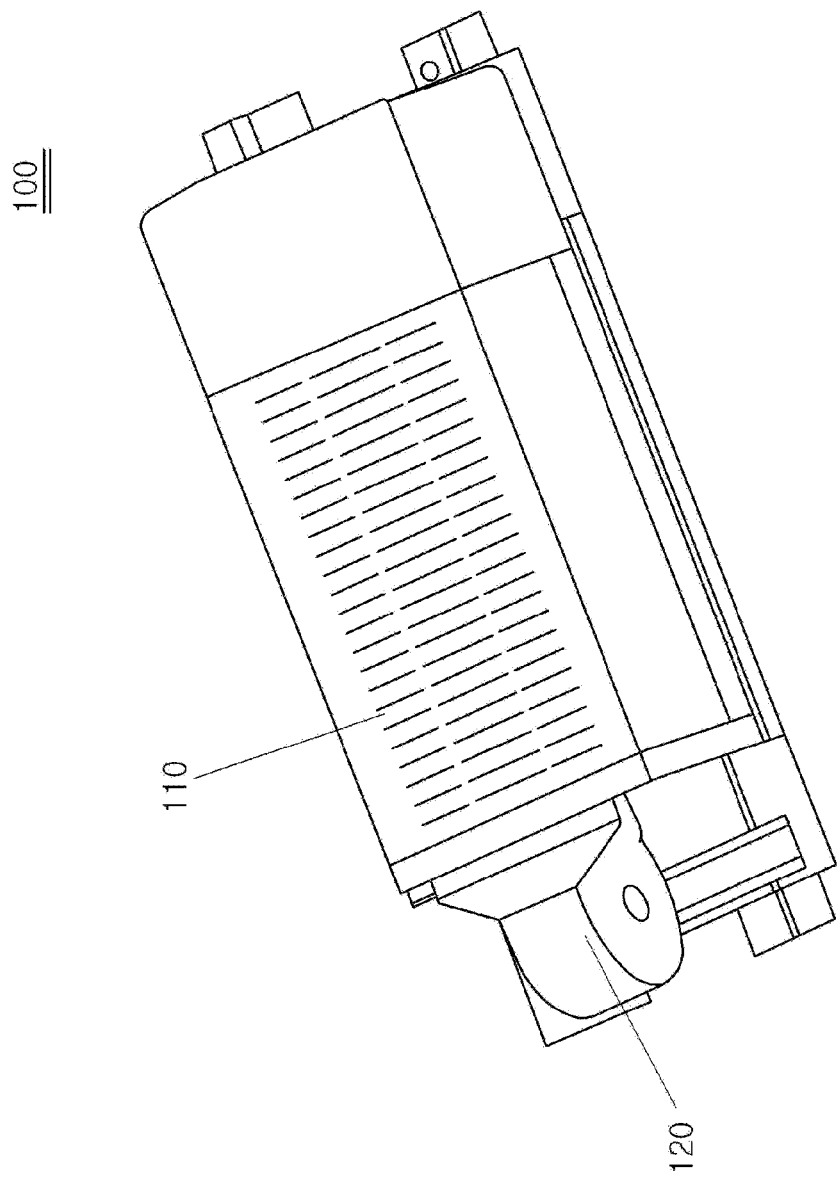
FIG. 1 is a perspective view showing a battery module of an eco-friendly vehicle.

Embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Referring to FIG. 1, a plurality of battery cells 110 are disposed and stacked in a housing of the battery module 100 and a blowing fan 120 is installed at one side of the battery module 100 to blow heated air to the battery module 100 in a low temperature through the blowing fan 120. As a result, the battery cells 110 are maintained at a suitable temperature.

As a resistance is rapidly increased at a low temperature (in general, below 0° C.), an output of the battery module 100 is lowered. The blowing fan 120 blows the raised temperature air to the battery cell to raise the temperature of the battery cells 110 constituting the battery module 100 so that a performance degradation of each battery cells 110 is prevented to allow the battery module 100 to perform a performance at a suitable level. For example, heat generated from an engine of a hybrid vehicle or heat generated through a separate heating means provided in an electric vehicle is transferred to the battery cell 100 when the blowing fan 120 blows air.

In an example, however, in the process of supplying air, which is flowed by the blowing fan 120, to each battery cell 110 through a flow passage 130, the flow rate of air supplied from the blowing fan 120 to each battery cell 110 is not controlled. Therefore, the flow rate of air supplied to the battery cells 110 is not uniform.

Figure 2:
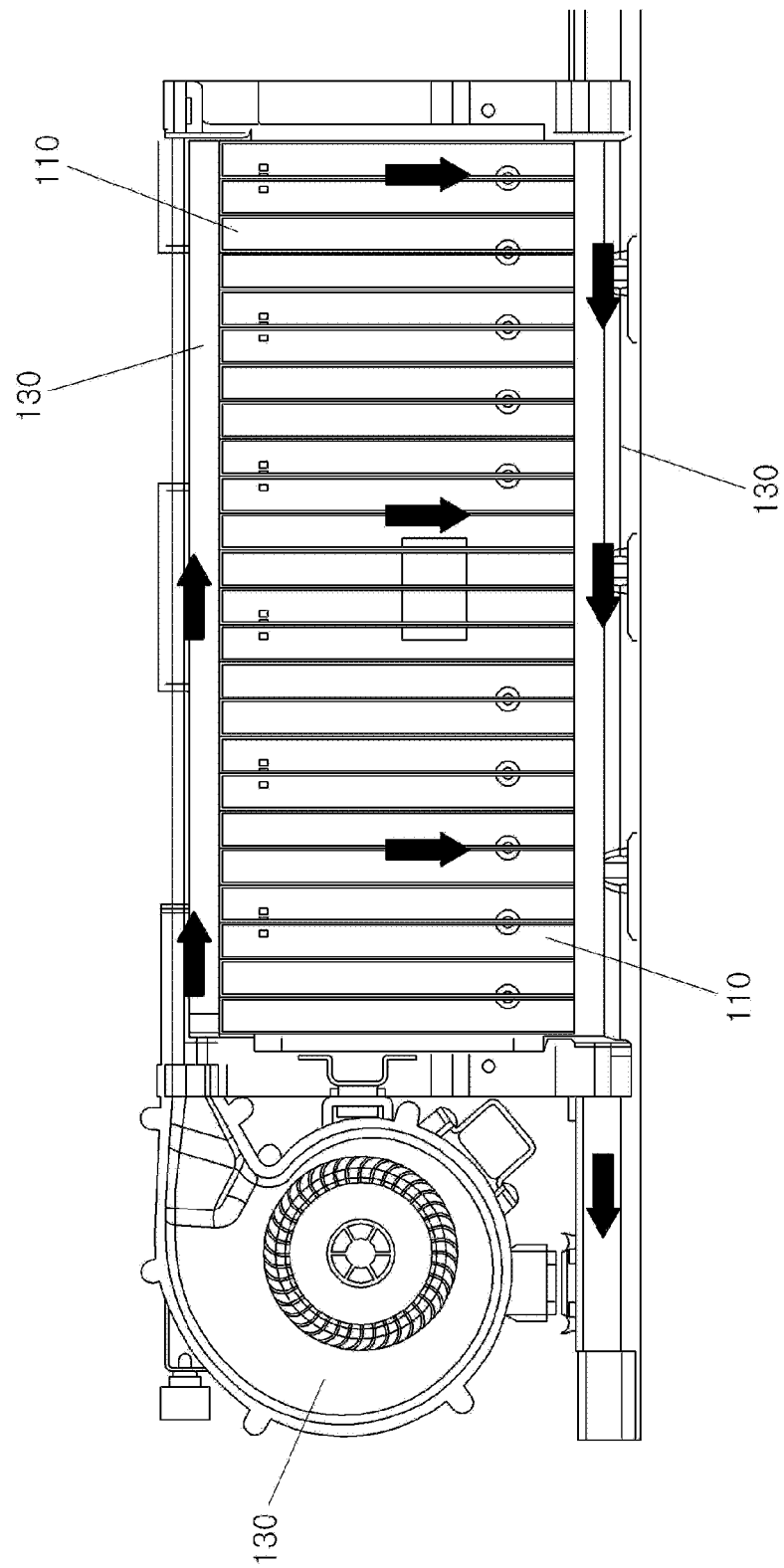
FIG. 2 is a plane view showing a device for raising a temperature of a battery-module in an eco-friendly vehicle.
Figure 3:
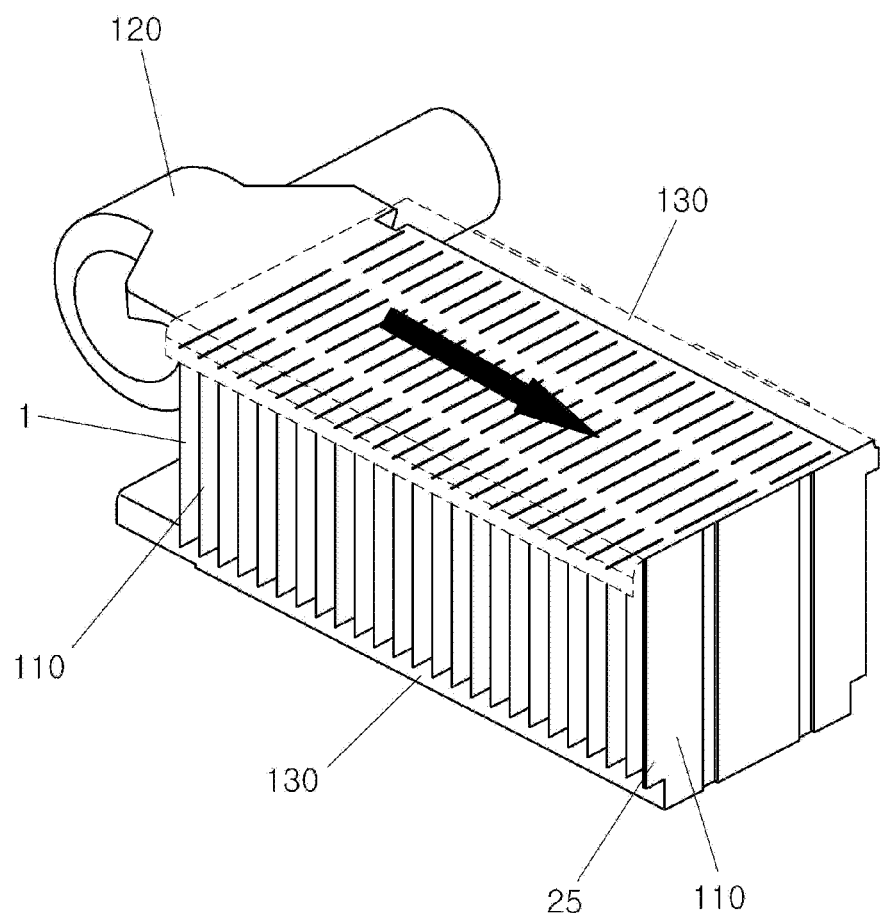
FIG. 3 is a perspective view showing an air flow in a device for raising a temperature of a battery-module in an eco-friendly vehicle.
Figure 4:
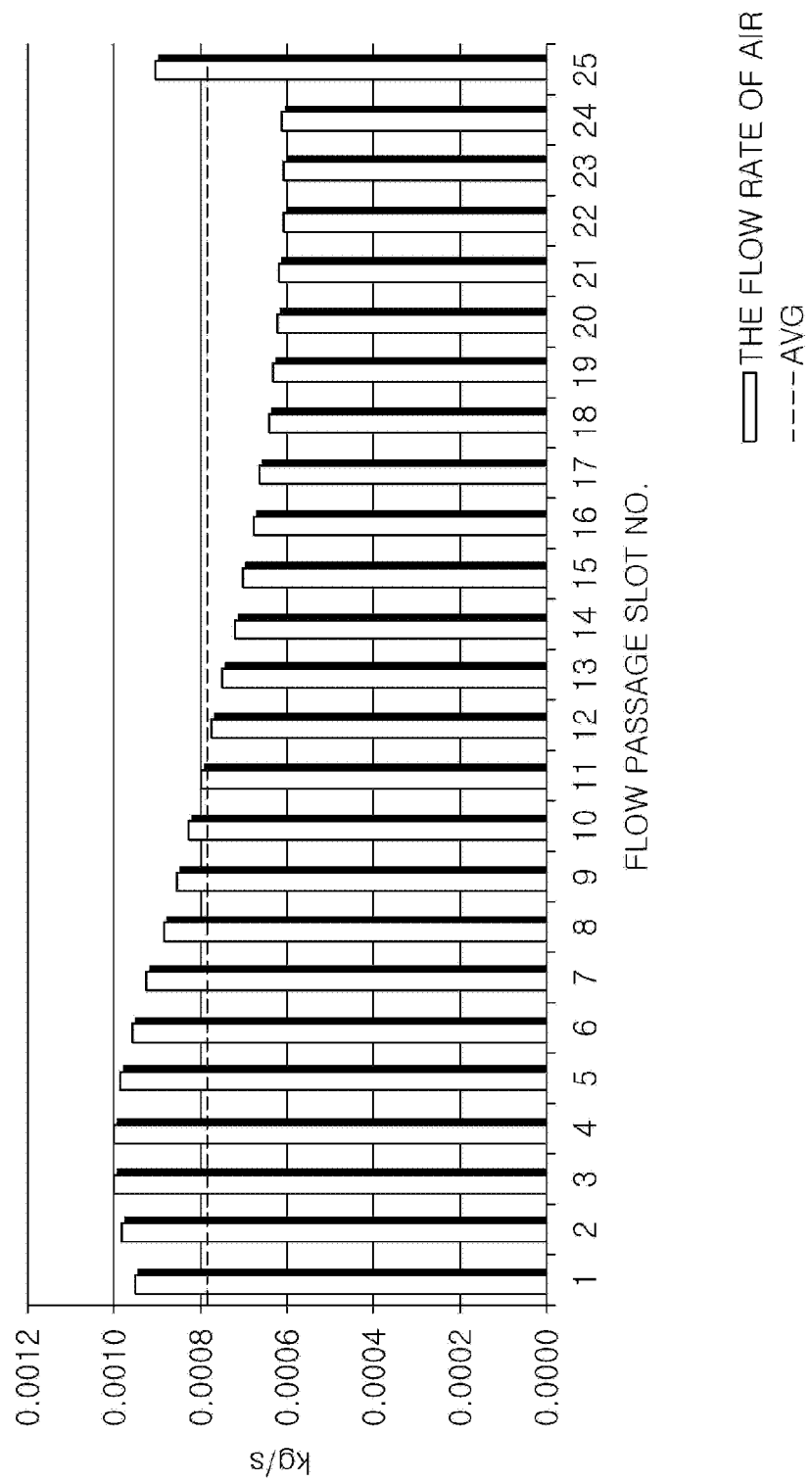
FIG. 4 is a graph showing a difference of air flow rate at each battery cell in a device for raising a temperature of a battery-module of an eco-friendly vehicle.

As shown in FIG. 2 and FIG. 3, in other words, air is supplied to each battery cell 100 through the flow passage 130 formed in the battery module 100. Since air is unequally supplied to the battery cells 110, a difference of the flow rate of air supplied to the battery cell 100 is generated as shown in FIG. 4.

Due to the above difference of the flow rate of air, the temperature of some of the battery cells 110 is excessively raised and some other battery cells 100 are maintained in a low temperature state. Consequently, a reduction of the entire output of the battery module 100 is caused.

In addition, since only ON/OFF control is performed for the blowing fan 120, the air flow rate which is suitable for the temperature of the battery cells 100 is not obtained.

Figure 5:
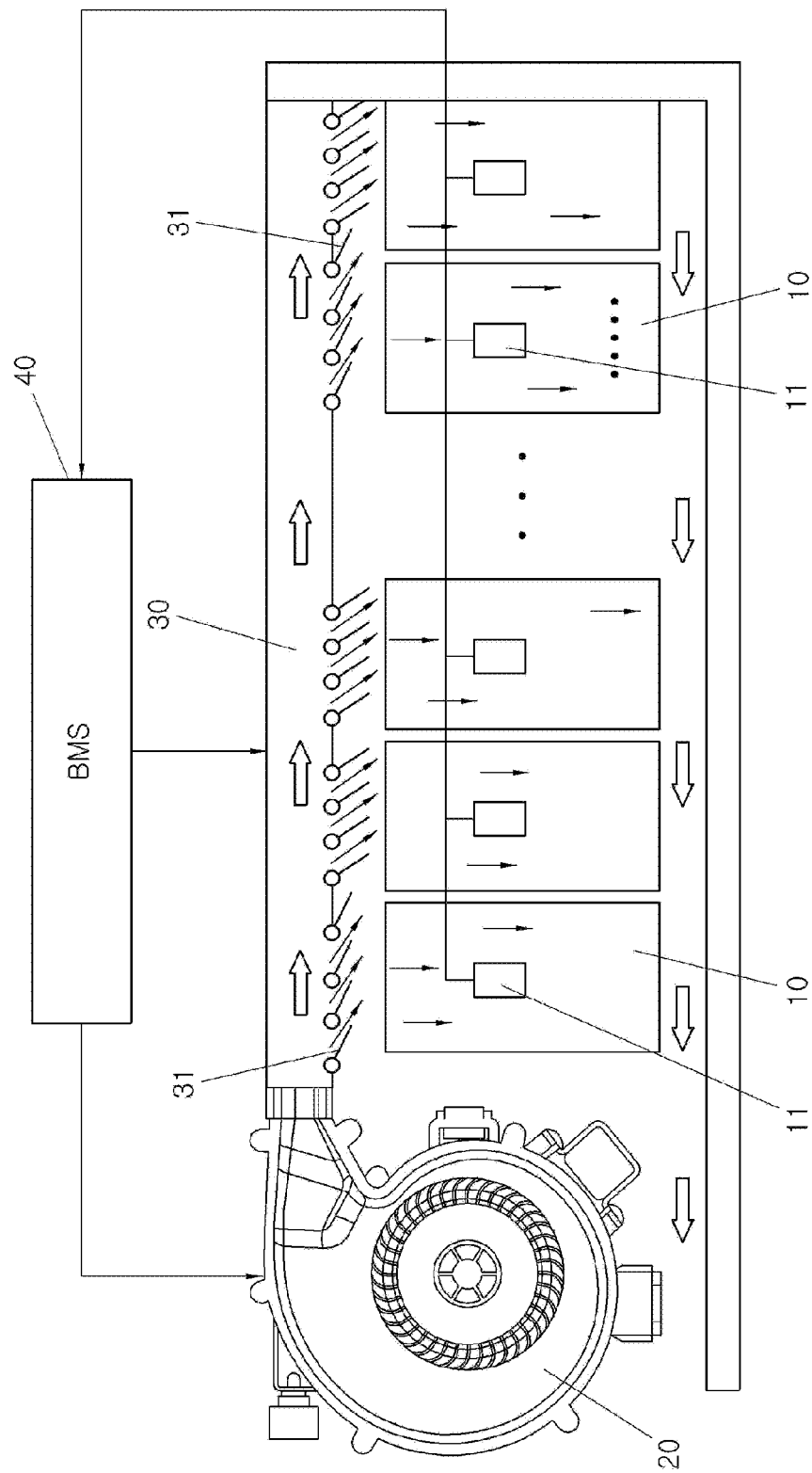
FIG. 5 is a plane view illustrating a device for raising a temperature of a battery module in an eco-friendly vehicle according to an embodiment of the present invention.

FIG. 5 is a plane view illustrating a device for raising a temperature of a battery module in an eco-friendly vehicle according to embodiments of the present invention. A device for raising a temperature of a battery module in an eco-friendly vehicle according to embodiments of the present invention includes a temperature sensor 11 provided on each battery cell 10 for measuring a temperature of corresponding battery cell 10, a flow passage 30 for guiding air flowed from a blowing fan 20 to each battery cell 10 and for discharging air passed through each battery cell 10 and an air flow rate control means provided at a region connecting the flow passage 30 and each battery cell 10 to control the flow rate of air introduced to each battery cell 10.

A plurality of battery cells 10 are provided in a battery module 1 and electrically connected to each other to allow the battery module 1 to be desired output. The battery module 1 includes a plurality of battery cells 10 and additional structural element for controlling the battery cells 10. The battery cells 10 are arranged in the direction perpendicular to a flow of air discharged from the blowing fan 20 and are disposed in parallel with each other.

In addition, the temperature sensor 11 is installed on each battery cell 10 to measure the temperature of each battery cell 10.

The blowing fan 20 is provided at one side of the battery module 1 to supply raised-temperature air into the battery module 10. When operating, the blowing fan 20 supplies heat generated in an engine of a hybrid vehicle or heat generated in a separate heating means of an electric vehicle to the battery module 1 together with air to blow raised-temperature air to the battery module.

Meanwhile, a temperature of the battery module 1 is sufficiently raised or there is need to cool the battery module, the blowing fan 20 can blow air in a state where heat generated in the engine or the separate heating means is blocked, to cool the battery module 1.

In the battery module 1, the flow passage 30 acts as a passage in which air flowed from the blowing fan 20 flows.

The air flow rate control means for controlling the flow rate of air introduced into to each battery cell 10 is provided at each region at which the flow passage 30 is connected to the battery cell 10. In other words, since an embodiment of the present invention is provided for varying the flow rate of air introduced into each battery cell 10, the air flow rate control means is installed at each region at which the battery cell 10 is connected to the flow passage 30 and the flow rate of air introduced to each battery cell 10 is varied according to an operation of the air flow rate control means. In particular, the air flow rate control means may be installed at the region through which raised temperature air is introduced from the flow passage 30 to the battery cell 10.

As one example of the air flow rate control means, a shutter blade 31 provided at one side of the flow passage may be employed. The shutter blade 31 is provided at one side of the flow passage 30 to control the flow rate of air supplied from the blowing fan 20 and introduced to each battery cell 10. In the flow passage 31, in other words, the shutter blade 31 is provided at the region connected to the battery cell 10 to adjust the flow rate of air introduced to the battery cell 10 according to an open proportion of the shutter blade 31. The open proportion of the shutter blade 31 is adjusted by an open angle of the shutter blade 31.

The shutter blade 31 is configured such that open angles of all the shutter blades are individually controlled.

Therefore, the open angle of the shutter blade 31 corresponding to the battery cell 10 whose temperature should be considerably raised is increased to allow the large flow rate of heated air to be introduced to the battery cell, and the open angle of the shutter blade 31 corresponding to the battery cell 10 having the relatively high temperature is reduced to allow the small flow rate of heated air to be introduced to the battery cell.

In addition, a plurality of shutter blades 31 may be provided at one battery cell 10.

A battery management system 40 (BMS) receives a signal regarding the temperature of each battery cell 10 from the temperature sensor 11 and controls the open angles of the shuttle blades 31 to make the battery cells 10 have the same temperature.

The BMS 40 receives the signal regarding the temperatures of the battery cells 10 from the temperature sensors 11 provided at the battery cells 10, respectively, and calculates factors required for controlling the blowing fan 20 and the shutter blades 31.

For example, the BMS 40 calculates an average temperature $T_{avg}$ which is an arithmetic mean of the temperatures of the battery cells 10 to calculate the flow rate of air flowed from the blowing fan 20, and controls the open angel of each shutter blade 31 to so as to allow the battery cells 10 to be out of a low temperature state and to have the uniform temperature.

Figure 6:
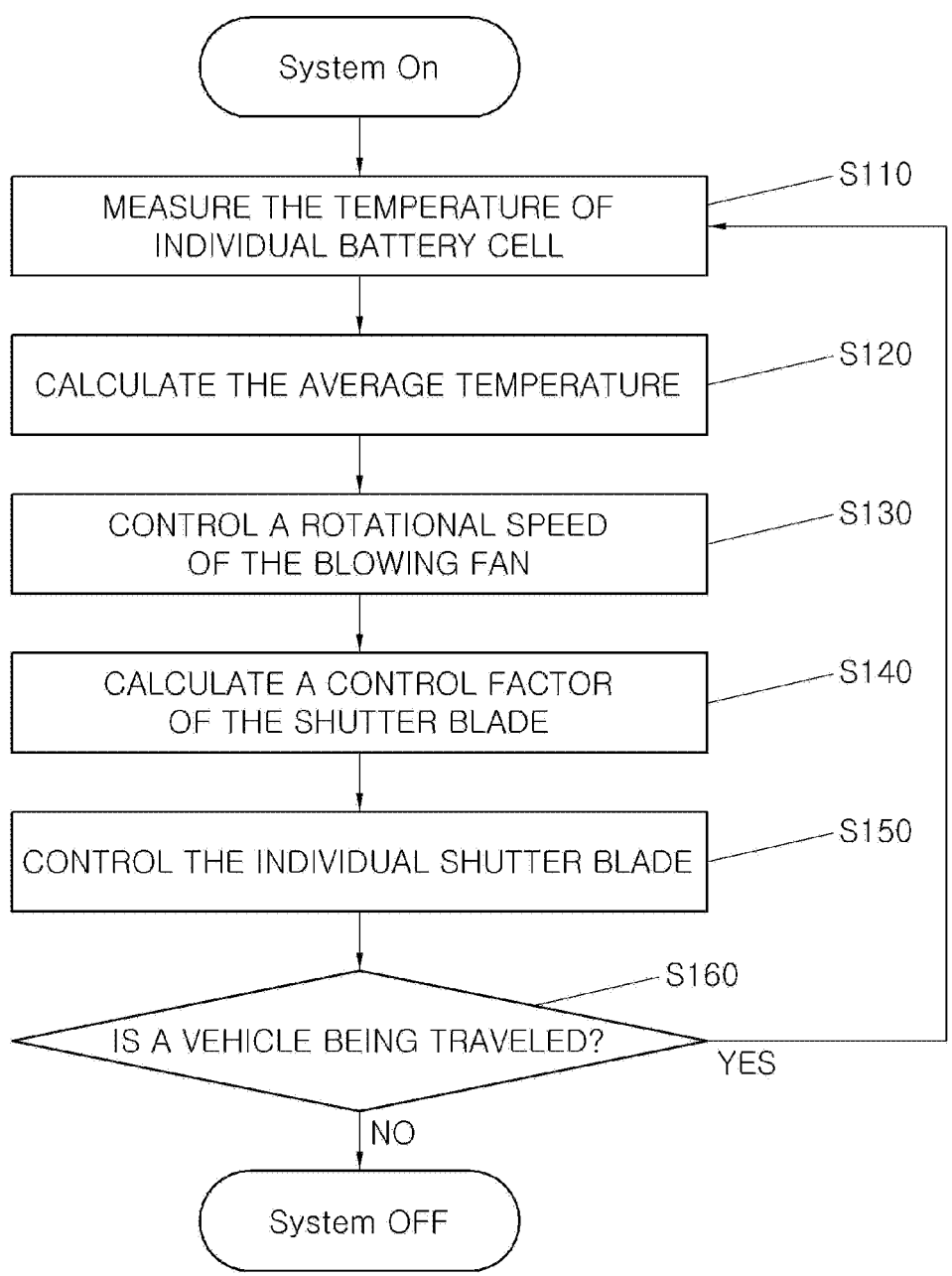
FIG. 6 is a flow chart for illustrating a method for raising a temperature of a battery module in an eco-friendly vehicle according to an embodiment of the present invention.

Hereinafter, a method for raising a temperature of the battery module in an eco-friendly vehicle according to embodiments of the present invention is described with reference to FIG. 6.

A method for raising a temperature of the battery module in an eco-friendly vehicle according to embodiments of the present invention includes an individual battery cell temperature measuring step S110 for measuring a temperature of each battery cell 10; a shutter blade open angle calculating step S140 for calculating an open angle of the shutter blade 31 which is provided at the region connecting the flow passage and the battery cell 10, in order to control the flow rate of air flowed from the blowing fan 20 and supplied to each battery cell 10 to allow the temperatures of the battery cells 10 to reach the same target temperature; and a shutter blade controlling step S150 for controlling the shutter blade 31 provided at each battery cell 10 on the basis of the open angle calculated in the shutter blade open angle calculating step S140.

The individual battery cell temperature measuring step S110 is the step for measuring the temperature of each battery cell 10 constituting the battery module 1 of the eco-friendly vehicle. By measuring the temperatures of the battery cells 10, the BMS 40 grasps the temperature of each battery cell 10 in real time and monitors whether the temperatures of the battery cells 10 constituting the battery module are uniformed. In addition, the temperature of individual battery cell 10 measured in the individual battery cell temperature measuring step S110 becomes a major factor for determining the flow rate of air to be supplied to each battery cell 10.

In an average temperature calculating step S120, an average temperature of the battery cells 10 constituting the battery module 1 is calculated.

For example, assuming that the temperatures of the first battery cell to the $N^{th}$ battery cell are $T_1, T_2, T_3, \ldots, T_n$ when the battery module 1 consists of N battery cells 10, the average temperature $T_{avg}$ may be calculated as an arithmetic mean of the temperatures of the battery cells 10 as below.

$T_{avg}=(T_1+T_2+T_3+\ldots+T_n)/N$

In a step S130 for controlling a rotational speed of the blowing fan, a rotational speed of the blowing fan 20 is controlled to determine the flow rate of air supplied to the entire battery module 1.

For example, the step S130 for controlling the rotational speed of the blowing fan may be controlled by a method as below Table 1.

TABLE 1

| Average temperature (° C.) | Blowing fan rotational speed control |
|---|---|
| 0 ≤ Tavg | FAN OFF or cooling control |
| −5 ≤ Tavg < 0 | FAN SPEED 1 |
| −10 ≤ Tavg < −5 | FAN SPEED 2 |
| −15 ≤ Tavg < −10 | FAN SPEED 3 |
| −20 ≤ Tavg < −15 | FAN SPEED 4 |
| −25 ≤ Tavg < −20 | FAN SPEED 5 |
| −30 ≤ Tavg < −25 | FAN SPEED 6 |
| −35 ≤ Tavg < −30 | FAN SPEED 7 |
| −40 ≤ Tavg < −35 | FAN SPEED 8 |
| Tavg < −40 | IG OFF |

In other words, the lower the average temperature ($T_{avg}$) of the battery cells, the more the flow rate of air supplied from the blowing fan 20 to the battery module 1 is increased.

In addition, the average temperature is divided into temperature ranges at predetermined interval, and the blowing fan 20 is operated at a rotational speed corresponding to the temperature range to which the average temperature of the battery cell 10 belongs.

Referring to the above table, for example, the average temperature is divided into eight (8) temperature ranges at an interval of 5° C., and the lower the average temperature ($T_{avg}$), the more the large flow rate of air is supplied. If the average temperature of the battery cells 10 of the battery module 1 is −13° C., the blowing fan 20 is operated at the rotational speed corresponding to three (3) stage, and if the average temperature of the battery cells is −17° C., the blowing fan 20 is operated at the rotational speed corresponding to four (4) stage.

In addition, if the average temperature of the battery cells 10 is lower than a predetermined operation halt temperature, the BMS 40 halts an operation of the battery cell.

The operation halt temperature is set as the lowest limit of the temperature range at which the blowing fan 20 is maximally operated, since the average temperature is divided into eight (8) temperature ranges from 0° C. at an interval of −5° C., the temperature of −40° C. may be set as the operation halt temperature.

The temperature of −40° C. may be set as the operation halt temperature, if the average temperature $T_{avg}$ is below 40° C., the operation of the battery cell is halted.

Meanwhile, if the average temperature is higher than a predetermined initiation temperature of a temperature raising process, an operation of the blowing fan 20 is halted or the blowing fan blows air in a state where heat supplied from the engine or the separate heating means is blocked to cool the battery cell.

The initiation temperature of the temperature raising process is the temperature at which the blowing fan begins to blow air to the low temperature battery cells 10. Also, the initiation temperature of the temperature raising process is the target temperature of the temperature raising process for the battery cells 10.

If the average temperature $T_{avg}$ is higher than the initiation temperature of the temperature raising process, the operation of the blowing fan is halted or the blowing fan blows air which is not heated to cool the battery cells 10.

The shutter blade open angle calculating step S140 is the process for calculating the open angle of the shutter blade 31 in order to distribute air flowed from the blowing fan and supplied to the battery module to the battery cells 10 to minimize a temperature difference between the battery cells 10.

So as to make the temperatures of the battery cells 10 reach the same the initiation temperature of the temperature raising process, in other words, the open angle of the shutter blade 31 provided at the connecting region between the flow passage and each battery cell 10 is calculated to control the flow rate of air flowed from the blowing fan 20 and supplied to each battery cell 10.

In the shutter blade open angle calculating step S140, at this time, the temperature difference between the average temperature $T_{avg}$ and the temperature of each battery cell 10 is obtained and the open angle of the shutter blade 31 is increased in proportion to the above temperature difference to increase the flow rate of air introduced to the corresponding battery cell 10.

For example, the step S140 for calculating the open angle of the shutter blade may be controlled as below.

TABLE 2

| Control level | Determine control factors of the shutter blade | Open angle (°) |
|---|---|---|
| 1 | MIN($T_a, T_b, T_c \ldots T_{n-avg}$) | 15 |
| 2 | MID-MIN($T_a, T_b, T_c \ldots T_{n-avg}$) | 20 |
| 3 | MID($T_a, T_b, T_c \ldots T_{n-avg}$) | 30 |
| 4 | MID-MAX($T_a, T_b, T_c \ldots T_{n-avg}$) | 45 |
| 5 | MAX($T_a, T_b, T_c \ldots T_{n-avg}$) | 60 |

The above table shows one example in which the flow rate of air introduced to the corresponding battery cell 10 is increased in proportion to the control level. The open angle of the shutter blade 31 provided at the battery cell 10 is increased in proportion to the temperature difference between the corresponding battery cell 10 and the average temperature $T_{avg}$, and if the above temperature difference is reduced, the open angle of the shutter blade 31 is also reduced.

For example, assuming that a temperature difference ($T_1-T_{avg}$) between the temperature of the first battery cell and the average temperature is $T_a$, a temperature difference ($T_2-T_{avg}$) between the temperature of the second battery cell and the average temperature is $T_b$, and a temperature difference ($T_n-T_{avg}$) between the temperature of the $N^{th}$ battery cell and the average temperature is $T_{n-avg}$, it is possible to divide the temperature difference in to five (5) regions and designate the open angle of the shutter blade 31 for each region.

That is, the temperature difference is divided into five (5) stages of a stage of 0° C., a stage of −1° C., a stage of −2° C. to −4° C., a stage of −5° C. to −9° C., and a stage of −10° C. or more, the open angle of the shutter blade is calculated such that the shuttle blade 31 is opened by 15°, 20°, 30°, 45° and 60° with respect the stages of the temperature difference, respectively.

Therefore, if a difference between the temperature of the battery cell 10 and the average temperature is 0 (no temperature difference), the open angle of the shutter blade 31 corresponding to the battery cell may be calculated as 15°. Also, if a difference between the temperature of the battery cell 10 and the average temperature is −2° C., the open angle of the shutter blade 31 corresponding to the battery cell may be calculated as 30°, and if a difference between the temperature of the battery cell 10 and the average temperature is 10° C., the open angle of the shutter blade 31 corresponding to the battery cell may be calculated as 60°.

The flow rate of air supplied to the battery module 1 is determined by the step 130 for controlling a rotational speed of the blowing fan and the shutter blade open angle calculating step S140.

In the shutter blade controlling step S150, the shutter blade 31 provided at each battery cell 10 is controlled to be opened according to the open angle calculated in the shutter blade open angle calculating step S140.

Since the shutter blades 31 are opened to the open angles, respectively, which are calculated in the shutter blade controlling step S150 and differ from each other, air supplied from the blowing fan 20 is distributed and introduced to each battery cell 10 so that the temperatures of the battery cells 10 constituting the battery module 1 are raised to the target temperature.

After the shutter blade controlling step S150, a vehicle traveling judging step S160 is carried out for judging whether the vehicle is being traveled. In the vehicle traveling judging step S160, if it is judged that the vehicle is being traveling, the procedure is returned to the individual battery cell temperature measuring step S110 and the above procedures are repeatedly performed, if it is judged that the vehicle is not traveled, the procedure is ended.

According to the device and method for raising a temperature of a battery module in an eco-friendly vehicle constructed as above, the temperature of each battery cell constituting the battery module in the eco-friendly vehicle is monitored and the shutter blades are controlled such that the flow rates of air supplied to the battery cells may differ from each other. Therefore, it is possible to enhance the output performance of the battery module.

In addition, by controlling the flow rate of air flowed from the blowing fan in light of the average temperature of the battery cells, the temperatures of the battery cells can be effectively raised.

While the present invention has been described with respect to embodiments, it will be apparent to those skilled in the art that various changes and modifications may be made without departing from the spirit and scope of the invention as defined in the following claims.

What is claimed is:

1. A battery device for use in a vehicle, the device comprising:
   a housing;
   a plurality of battery cells disposed in the housing a first one of the plurality of battery cells being located in a first area within the housing;
   a blower comprising a blowing fan configured to generate an air flow;
   a plurality of temperature sensors configured to detect temperature and disposed in the housing and, a first one of the plurality of temperature sensors being located in the first area within the housing and configured to detect temperature of the first battery cell located in the first area;

a flow passage connected to the blower for guiding the air flow from the blowing fan therealong; and a shutter device comprising a plurality of blades installed along the flow passage and between the flow passage and the plurality of battery cells, wherein the plurality of blades are grouped in multiple groups such that each group of blades corresponds to an area within the housing and is configured to change orientation of one or more of its blades for controlling an amount of air directed to its corresponding area within the housing from the air flow flowing in the flow passage, wherein a first one of the multiple groups corresponds to the first area within the housing;

a controller configured to control the first group for changing orientation of one or more blades thereof to control an amount of air directed to the first area from the air flow flowing in the flow passage based on the temperature detected by the first temperature sensor.

2. The device of claim 1, wherein each group of blades is controlled independent of the other groups.

3. The device of claim 1, wherein the controller is configured to control the first group such that the lower the temperature of the first area, the larger amount of air is directed to the first area.

4. The device of claim 1, wherein the controller is further configured to control a speed of the blowing fan based on the detected temperature of the first battery cell.

5. The device of claim 1, wherein the blowing fan is controlled based on an average of temperatures detected from the plurality of sensors located within the housing.

6. The device of claim 1, wherein the blowing fan is configured to receive air heated using heat generated from an engine of the vehicle, and the blowing fan is configured to blow heated air.

7. The device of claim 1, wherein the battery cells are arranged in a direction generally perpendicular to the air flow in the flow passage.

8. A method of operating the battery device of claim 1, the method comprising;

detecting temperature of the first battery cell;

calculating desired orientation of the first group of blades to control the amount of air directed to the first area such that the temperature of the first battery cell reaches a target temperature; and changing the orientation of the first group of blades to the desired orientation.

9. The method of claim 8, further comprising;

detecting temperatures using the plurality of sensors located within the housing;

calculating an average temperature of the detected temperatures; and controlling a rotational speed of the blowing fan to control the amount of the air flow based on the average temperature.

10. The method of claim 9, wherein the blowing fan is controlled such that the rotational speed of the blowing fan is increased when the average temperature is lower than a predetermined temperature.

11. The method of claim 10, wherein the blowing fan is controlled to run at a predetermined speed when the average temperature falls within a predetermined temperature range.

12. The method of claim 10, wherein the device comprises a memory storing a plurality of predetermined temperature ranges, each of which corresponds a speed of the blower fan, wherein when the average temperature falls within one of the predetermined temperature ranges, the blowing fan is controlled to run at the corresponding speed.

13. The method of claim 12, wherein when the average temperature reaches a predetermined operation halt temperature, an operation of the battery cells is halted.

14. The method of claim 13, wherein the operation halt temperature is set as the lowest limit of the predetermined temperature range at which the speed of the blowing fan is maximally set.

15. The method of claim 8, wherein the desired orientation is determined by a difference between the average temperature and the detected temperature of the first battery cell.

16. The method of claim 15, wherein the amount of air to be directed to the first area is increased in proportion to the difference between the average temperature and the detected temperature of the first battery cell.

17. The method of claim 16, wherein the temperature difference between the average temperature and the detected temperature of the first battery cell is divided into multiple ranges, and the orientation is changed to a predetermined orientation corresponding to the temperature difference which falls within one of the multiple ranges.

* * * * *